United States Patent
Uehlin et al.

(10) Patent No.: US 9,228,914 B2
(45) Date of Patent: Jan. 5, 2016

(54) COMPOSITE MATERIAL, FORMED BODY, ELECTRONIC DEVICE WITH FORMED BODY, AND METHOD FOR MANUFACTURING A FORMED BODY

(75) Inventors: Thomas Uehlin, Schopfheim (DE); Andreas Rossberg, Bad Säckingen (DE); Sergej Lopatin, Lörrach (DE)

(73) Assignee: Endress + Hauser GmbH + Co. KG, Hauptstr, Maulburg (DE)

( * ) Notice: Subject to any disclaimer, the term of this patent is extended or adjusted under 35 U.S.C. 154(b) by 85 days.

(21) Appl. No.: 13/990,512

(22) PCT Filed: Nov. 23, 2011

(86) PCT No.: PCT/EP2011/070812
§ 371 (c)(1),
(2), (4) Date: Aug. 19, 2013

(87) PCT Pub. No.: WO2012/072465
PCT Pub. Date: Jun. 7, 2012

(65) Prior Publication Data
US 2014/0298915 A1    Oct. 9, 2014

(30) Foreign Application Priority Data
Dec. 1, 2010    (DE) .......................... 10 2010 062 295

(51) Int. Cl.
| | |
|---|---|
| *G01L 9/00* | (2006.01) |
| *G01L 19/06* | (2006.01) |
| *C08K 3/36* | (2006.01) |
| *B01J 20/26* | (2006.01) |
| *B01J 20/30* | (2006.01) |
| *B01J 20/28* | (2006.01) |
| *B01J 20/10* | (2006.01) |

(52) U.S. Cl.
CPC .......... *G01L 19/0654* (2013.01); *B01J 20/103* (2013.01); *B01J 20/26* (2013.01); *B01J 20/261* (2013.01); *B01J 20/262* (2013.01); *B01J 20/264* (2013.01); *B01J 20/28042* (2013.01); *B01J 20/3007* (2013.01); *B01J 20/3078* (2013.01); *C08K 3/36* (2013.01); *B01J 2220/46* (2013.01)

(58) Field of Classification Search
None
See application file for complete search history.

(56) References Cited

U.S. PATENT DOCUMENTS

| | | | |
|---|---|---|---|
| 4,871,376 A | * | 10/1989 | DeWald .......................... 51/298 |
| 5,656,195 A | | 8/1997 | Mielke |

(Continued)

FOREIGN PATENT DOCUMENTS

| | | |
|---|---|---|
| DE | 4409309 A1 | 9/1995 |
| DE | 19533565 A1 | 3/1997 |

(Continued)

OTHER PUBLICATIONS

German Search Report, Munich, Jul. 4, 2011.

(Continued)

*Primary Examiner* — Andre Allen
(74) *Attorney, Agent, or Firm* — Bacon & Thomas, PLLC

(57) ABSTRACT

A composite material includes a polymer matrix and silica gel, which is bound in the polymer matrix. The volume fraction of the silica gel to the volume fraction of the composite material amounts to at least 50%, especially at least 65%. An electronic device, especially measuring device, includes at least one housing having at least one inner space, which contains an electronic circuit, wherein the device has at least one gas path, via which moisture can get into the housing, wherein the device has at least one formed body of the composite material.

5 Claims, 3 Drawing Sheets

(56) References Cited

U.S. PATENT DOCUMENTS

| | | | |
|---|---|---|---|
| 8,025,625 B2* | 9/2011 | Allen | 600/561 |
| 2007/0107524 A1* | 5/2007 | O'Brien et al. | 73/754 |
| 2007/0261497 A1* | 11/2007 | O'Brien et al. | 73/724 |
| 2013/0019687 A1* | 1/2013 | Wosnitza et al. | 73/700 |

FOREIGN PATENT DOCUMENTS

| | | |
|---|---|---|
| DE | 19634109 A1 | 2/1998 |
| EP | 0340707 B1 | 11/1989 |
| EP | 0512401 A2 | 11/1992 |
| EP | 1323468 A1 | 7/2003 |
| WO | 2004043409 A1 | 5/2004 |

OTHER PUBLICATIONS

Chujo Y. et al., "Organic Polymer Hybrids with Silica Gel Formed by Means of the Sol-Gel Method", Advances in Polymer Science, Berlin, Germany, vol. 100, Jan. 1, 1992, pp. 12-29, XP000431443.
International Search Report, The Netherlands, Feb. 22, 2012.
English translation of the IPR, WIPO, Geneva, Jun. 13, 2013.

* cited by examiner

COMPOSITE MATERIAL, FORMED BODY, ELECTRONIC DEVICE WITH FORMED BODY, AND METHOD FOR MANUFACTURING A FORMED BODY

TECHNICAL FIELD

The present invention relates to a composite material, a formed body having such a composite material, an electronic device having such a formed body, and a method for manufacturing such a formed body.

BACKGROUND DISCUSSION

Electronic devices have frequently, depending on the manner of construction, a housing, into which moisture can penetrate. Condensation of this moisture on circuit components in the interior of the housing can lead to malfunctions, or even complete failure of the device. It is, consequently, important that this be prevented over long periods of time.

To this end, it is known to provide moisture filters in housing openings, or to arrange absorbers in the housing. The described adsorbers prove, however, not to be satisfactory for long term use, especially in the face of temperature changes.

The as yet unpublished patent application DE 10 2010 038 986 discloses a composite material, which has a polymer matrix and a zeolite. Since zeolites only desorb adsorbed water at comparatively high temperatures, the composite material requires the use of correspondingly temperature-resistant polymers, when a drying of formed bodies of this composite material should be possible. This leads, however, to the fact that the selection of suitable polymers is significantly limited, and that, additionally, the costs for the composite material increase, since temperature-resistant polymers are expensive. Additionally, in the case of normal operating temperatures of a usual electronic device, the desorption temperature of water bound in zeolite is not reached. This means that a formed body of a composite material containing zeolite, even in the case of great dryness in the environment, is scarcely able to shed bound water. Because of this, there is lacking an opportunity for controlled shedding of moisture at times of dryness for lengthening the service life of a formed body formed of the composite material to serve as desiccant.

SUMMARY OF THE INVENTION

It is, therefore, an object of the present invention to provide a remedy for this situation.

The object is achieved according to the invention by a composite material a formed body an electronic device and a method for manufacturing a formed body.

The composite material of the invention comprises: a polymer matrix; and a silica gel, which is bound in the polymer matrix; wherein the volume fraction of the silica gel to the volume fraction of composite material amounts to at least 50%, especially at least 65%.

In a further development of the invention, the polymer matrix comprises a polymer, which is selected from a group composed of thermoplastic polymers, such as fluorine-containing, synthetic materials, poly(aryl ether ketone)s, sulfur polymers, polyolefins and high heat resistance polymers.

The fluorine-containing, synthetic materials include according to the invention PTFE, i.e. polytetrafluoroethylene, PCTFE, i.e. polychlorotrifluoroethylene, ECTFE, i.e. ethylene chlorotrifluoroethylene or ethylene-chlorotrifluoroethylene-fluoro copolymer, FEP, i.e. fluoroethylene-propylene, PFA, i.e. perfluoro alkoxyl alkane, as well as PVDF, i.e. polyvinylidene fluoride.

Polyaryletherketones include according to the invention PEEK, i.e. polyetheretherketone and PEK, i.e. polyetherketone.

The sulfur polymers include according to the invention PSU, i.e. polysulfone, PES, i.e. polyether sulphone, PPS, i.e. polyphenylene sulfide and PPSU, i.e. polyphenylsulfone.

The high heat resistance synthetic materials comprise according to the invention PA, i.e. polyamide, PI, i.e. polyimide, PAI, i.e. polyamide-imide and PEI, i.e. polyetherimide.

Other suitable synthetic materials include polyolefins, such as polyethylene (PE), polypropylene (PP) as well as synthetic materials from other groups of material, such as silicones (polyorganosiloxanes), styrene-polymers, such as polystyrene (PS), acrylonitrile butadiene styrene (ABS), polyacrylates, such as polyacrylonitrile (PAN), polymethylmethacrylate (PMMA), thermoplastic polyesters, such as polycarbonate (PC), polyethylene terephthalate (PET), polybutylene terephthalate (PBT), polyphenylene ether (PPE), polyadducts, such as epoxide resin (EP) or polyurethanes (PU).

Especially, the synthetic materials named in this paragraph are available at significantly lesser costs than the earlier named synthetic materials.

The named synthetic materials are all temperature stable to 80-100° C., whereby it is possible to dry the formed bodies of the invention at 80-100° C. and to use them at lower temperatures as absorbers. In vacuum, the drying temperature can be additionally reduced according to a further development of the invention.

In a further development of the invention, the silica gel has an average particle size of no greater than 1 mm, especially no greater than 0.5 mm. On the other hand, the average particle size according to a further development of the invention amounts to not less than 0.1 mm, especially not less than 0.2 mm.

The formed body of the invention comprises a composite material of the invention.

In a further development of the invention, the volume $V_{min}$ of a minimum convex hull of the formed body and the surface area $A_{min}$ of the minimum convex hull obey the relationship, $(V_{min})^{2/3}/A_{min} > 1/20$, especially $> 1/10$.

In a further development of the invention, the volume $V_k$ of the formed body and the surface area $A_k$ of the formed body obey the relationship, $(V_K)^{2/3}/A_k > 1/30$, especially $> 1/20 > 1/15$.

The electronic device of the invention, which can especially be a measuring device, comprises at least one housing having at least one inner space, which contains an electronic circuit, wherein the device has at least one gas path, via which moisture can get into the housing, wherein the device according to the invention has at least one formed body of the invention, wherein the formed body especially can be arranged in the inner space.

The electronic device can according to the invention especially be a measuring device. Such measuring devices can especially be measuring devices of industrial process measurements technology. Such measuring devices have, usually, a sensor and an electronic circuit, which conditions the signals of the sensor and provides them for output on a display i.e. on a control system. Such measuring devices can be, especially, measuring devices for pressure, fill level, flow, temperature, pH, and other analytical parameters.

Moisture problems can occur in these measuring devices at any number of locations; especially the electronics and the sensor element need to be protected from moisture.

The pressure measuring devices include such having a relative pressure sensor for measuring the difference between a media pressure and an atmospheric pressure in the environment of the sensor of special interest, wherein such devices have an atmospheric pressure path, in order to supply the relative pressure sensor with the atmospheric pressure, wherein the atmospheric pressure path extends especially through the formed body.

In general, the invention is also relevant for any electronic devices, which have especially high resistance circuits under the influence of moisture and condensate formation. Such devices include, for example, hydrophones, ultrasonic transducers, microphones, electret microphones, acceleration transducers and any type of capacitive transducer.

In a further development of the invention, the volume of the formed body amounts to not less than 20%, preferably not less than 40% and especially preferably not less than 50% of the free volume of the inner space.

The method of the invention for manufacturing a formed body of the invention comprises steps as follows:

Producing a dispersion, which contains particles of a polymer for forming a polymer matrix and silica gel;

forming from the dispersion; and solidifying the formed body.

In an embodiment, the forming includes drying the dispersion; pressing the dried dispersion into a form for forming the formed body. The solidifying in this embodiment can comprise sintering, for example.

In general, the solidifying can include, besides sintering, also firing or polymerizing. Other methods of forming in the invention comprise casting, especially injection molding, and extruding.

In general, the forming, respectively the solidifying, can, according to a further development of the invention, include pressing, hot isostatic pressing, sintering, extruding and/or injecting the composite material.

BRIEF DESCRIPTION OF THE DRAWINGS

The invention will now be explained in greater detail based on examples of embodiments illustrated in the drawing, the figures of which show as follows.

DETAILED DISCUSSION IN CONJUNCTION WITH THE DRAWINGS

For manufacturing the composite material, a mixture of 35 vol. % PTFE powder TFM1700 and 65 vol. % silica gel (particle size 0.2-0.5 mm) was dispersed in ethanol and dried. From the dried mixture, cylindrical bodies were pressed at a pressure of 100 MPa and sintered at 360° C. for one hour.

The so sintered body provides a solid body suitable to serve as an absorber body.

Figure 1:
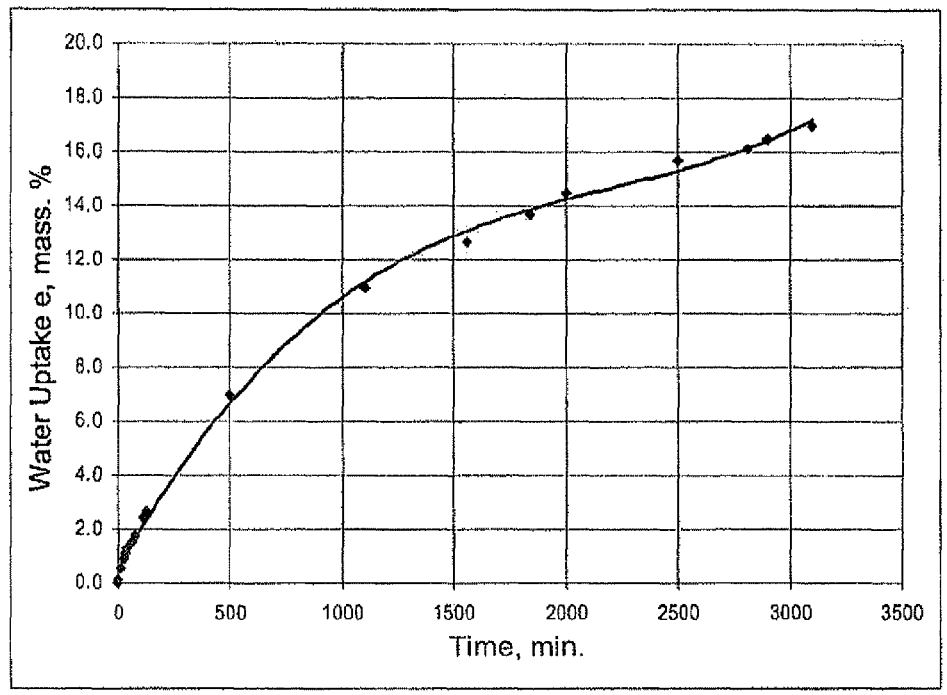
FIG. 1 a sorption isotherm in mass % of water in an example of an embodiment of a formed body of the invention in the case of relative humidity of 60% at 25° C.

A moisture uptake of, for instance, 22 mass-.% at 25° C. and a relative humidity of 60%, respectively 45 mass-% at 25° C. and a relative humidity of 95% was observed. A typical moisture uptake curve for a composite of composition, 40 vol. % PTFE and 60 volume-% silica gel with a particle size of 0.2-0.5 mm, is shown in FIG. 1. This sorption isotherm is for a relative humidity of 60% at 25° C.

Figure 2:
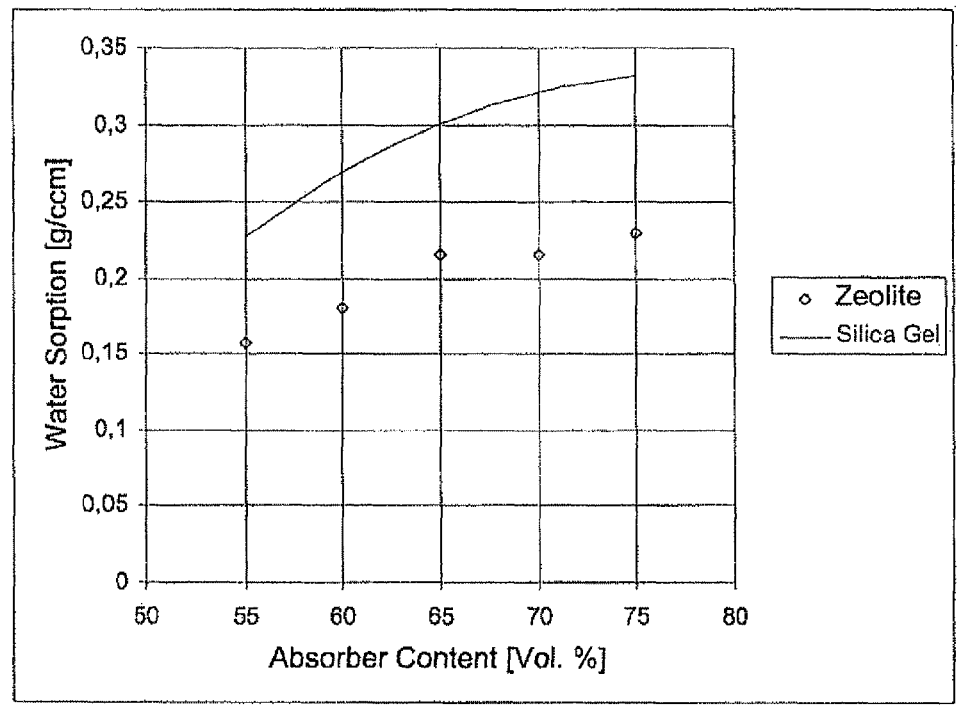
FIG. 2 water absorption after, for instance, 90 hours at 25° C. and relative humidity of 60% for different absorber contents in the formed body.

FIG. 2 relates to the influence of the absorber content of composite materials, i.e. therefrom manufactured, formed bodies, on water uptake. The optimal composite materials have an absorber content of 60 vol. % to 80 vol. %. For this range, for example, in the case of the zeolite containing composite materials investigated more exactly as reference system, the absorber packing density, thus the mass of adsorbed water per unit volume of the composite, changes little and the water uptake per unit volume of the composite material remains essentially constant, as is shown in FIG. 2. In the said region for the absorber content, one achieves, thus, a certain robustness against slight fluctuations of the product composition.

The relationship between water absorption and silica gel concentration following from the experimental data is presented in FIG. 2 as a solid line.

The composite materials of the invention differ with changing composition also in mechanical stability, which decreases with an increasing silica gel content. Composite materials with up to 75 vol. % silica gel are mechanically stable, i.e. form stable. Above 75 vol. %, the composite materials, i.e. the formed bodies, are soft and break easily. A currently preferred combination of mechanical stability and favorable water uptake is provided by material with 60-70 vol. % silica gel.

Figure 3:
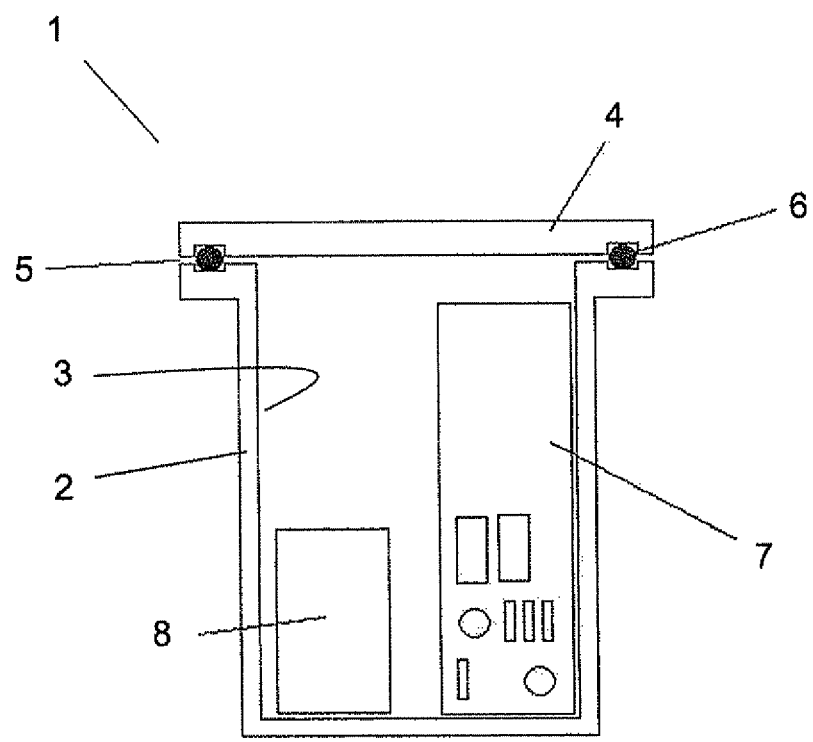
FIG. 3 a schematic longitudinal section through an example of an embodiment of an electronic device of the invention.

The electronic device 1 shown in FIG. 3 includes a cylindrical housing 2, whose inner space 3 is closed with a housing lid 4. Extending between the cylindrical housing 2 and the housing lid is a gap 5, which contains a sealing ring 6 for sealing the inner space 3, wherein a diffusion of water into the housing cannot therewith be completely excluded. In order to protect an electronic circuit 7 arranged in the inner space 3 reliably against penetrating moisture, there is furthermore arranged in the inner space a formed body 8 of the invention.

The formed body comprises a composite material with, for instance, 65 vol. % silica gel and 35 vol. % PTFE, wherein the formed body is formed as a sinter body.

Figure 4:
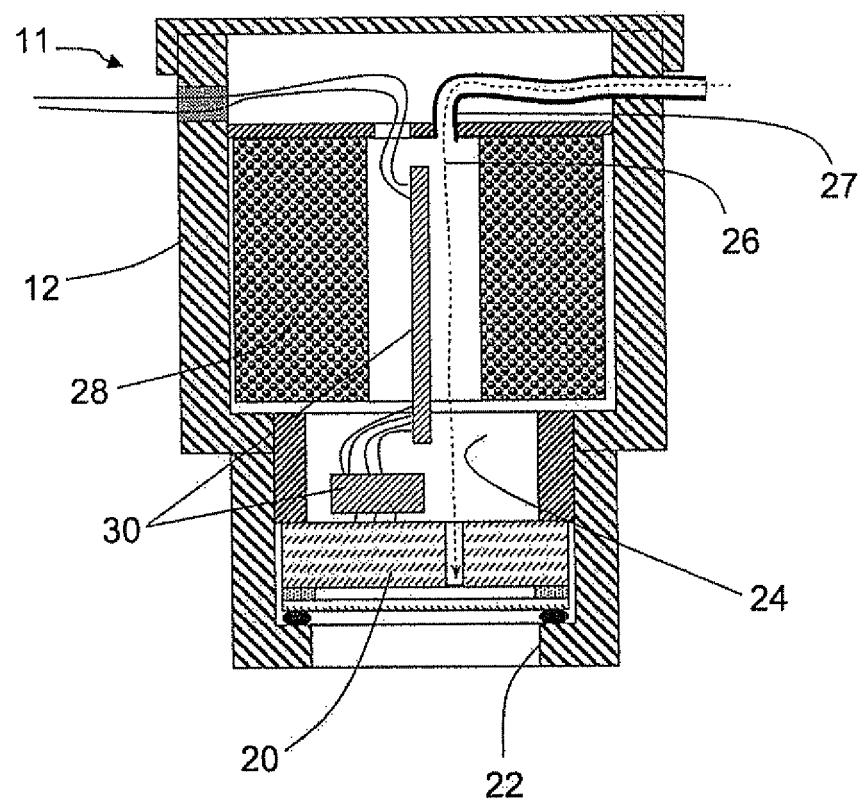
FIG. 4 a schematic longitudinal section through an example of an embodiment of a relative pressure measurement transmitter of the invention.

The relative pressure measurement transmitter 11 shown in FIG. 4 includes a housing 12 and a relative pressure sensor 20, which is arranged in the housing and contactable via a housing opening 22 with a media pressure. Extending through an inner space 24 of the housing is a reference air path 26, which can, in given cases, be led, at least sectionally, in a hose 27, wherein the reference air path extends through a formed body of the invention 28, which is arranged in the inner space 24. Inner space 24 contains, furthermore, a processing circuit 30 for signals of the relative pressure sensor, and for output of a signal, which represents the relative pressure, to a control system. The formed body 28 takes up at least 40% of the free volume of the inner space 24, and is, thus, able to adsorb moisture penetrating via the reference air path or gaps between components, and therewith to prevent condensation of water on the processing circuit 30 over a period of a number of years.

The invention claimed is:

1. An electronic device, especially a measuring device, comprising:
   at least one housing having at least one inner space, which contains an electronic circuit, wherein:
   the device has at least one gas path, via which moisture can get into the housing; and
   in that the device has at least one formed body, comprising a composite material, including: a polymer matrix; and silica gel, which is bound in the polymer matrix, wherein:
   the volume fraction of the silica gel to the volume fraction of the composite material amounts to at least 50%.

2. The electronic device as claimed in claim 1, wherein: said formed body is arranged in the inner space.

3. The electronic device as claimed in claim 1, wherein:
   the device includes a relative pressure sensor for measuring the difference between a media pressure and an atmospheric pressure in the environment of the sensor;
   the device has an atmospheric pressure path, in order to supply the pressure sensor with the atmospheric pressure; and
   the atmospheric pressure path extends especially through the formed body.

4. The electronic device as claimed in claim 1, wherein:
   the volume of the formed body amounts to not less than 20%, preferably not less than 40% and especially preferably not less than 60% of the free volume of the inner space.

5. The electronic device as claimed in claim 1, wherein:
   the volume fraction of the silica gel to the volume fraction of the composite material amounts to at least 65%.

* * * * *